(12) United States Patent
Jeng et al.

(10) Patent No.: US 6,192,075 B1
(45) Date of Patent: *Feb. 20, 2001

(54) SINGLE-PASS VARIABLE BIT-RATE CONTROL FOR DIGITAL VIDEO CODING

(75) Inventors: Fure-Ching Jeng, Sunnyvale; Cheng-Tie Chen, San Jose; Chia-Chun Huang, Sunnyvale, all of CA (US)

(73) Assignee: Stream Machine Company, San Jose, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/918,682

(22) Filed: Aug. 21, 1997

(51) Int. Cl.⁷ ..................................................... H04N 7/12
(52) U.S. Cl. ........................ 375/240; 382/239; 382/236; 382/250; 382/251
(58) Field of Search ............................... 348/405, 404, 348/403, 390

(56) References Cited

U.S. PATENT DOCUMENTS

| | | | |
|---|---|---|---|
| 5,231,484 | * 7/1993 | Gonzales et al. | 358/133 |
| 5,631,644 | * 5/1997 | Katata et al. | 341/67 |
| 5,680,483 | * 10/1997 | Tranchard | 348/405 |
| 5,686,962 | * 11/1997 | Chung et al. | 348/402 |
| 5,686,963 | * 11/1997 | Uz et al. | 348/404 |
| 5,719,632 | * 2/1998 | Hoang et al. | 348/419 |
| 5,724,453 | * 3/1998 | Ratnaker et al. | 348/405 |
| 5,729,294 | * 3/1998 | Linzer et al. | 348/405 |
| 5,745,178 | * 4/1998 | Hartung et al. | 348/405 |
| 5,801,779 | * 9/1998 | Uz et al. | 348/405 |
| 5,802,213 | * 9/1998 | Gardos | 348/405 |

* cited by examiner

*Primary Examiner*—Chris S. Kelley
*Assistant Examiner*—Shawn S. An
(74) *Attorney, Agent, or Firm*—Fernandez & Associates, LLP

(57) ABSTRACT

Integrated circuit provides single-pass, real-time digital image encoding by digital signal processor for variable bit rate (VBR) control to improve decoded output quality. Possible peak bit rate range for multiple groups of pictures (GOP) and averaged bit rate limit encoded signal bit rate. Possible bit rate range constraint sets upper/lower range, which is pre-specified or dynamically adapted for current and future GOPs. Signal processor calculates perceptual weighting variable at macroblock level for multiple GOPs, nominal quantization parameters for multiple GOPs, quantization parameter associated at picture level, effective bit rate for each GOP, bit allocation for each picture, and total bit allocation for multiple GOPs. Variable rate signal is recordable in DVD or camcorder device.

16 Claims, 5 Drawing Sheets

SINGLE-PASS VARIABLE BIT-RATE CONTROL FOR DIGITAL VIDEO CODING

BACKGROUND OF THE INVENTION

1. Field of the Invention

The invention relates to digital image encoding, particularly to electronic processing of digitally-compressed video signals.

2. Description of Background Art

Industry-standards for encoding and decoding digitally-compressed video signals are known as MPEG ("Moving Picture Experts Group") I and II, as set forth by International Standardization Organization (Geneva) and published in ISO/IEC 13818-2, Recommendation ITU-T. H.262 (1995E), Test Model 5, Draft Revision 2 (Apr. 7, 1993), and ISO/IEC 11172-2 (1993), which are hereby incorporated by reference.

One approach to improving digital video quality, as produced according to MPEG II, is by controlling video signal processing bit rate. See, for example, U.S. Pat. No. 5,631,644 to Katata, et al. for "Image Encoding Apparatus." Conventional approach for bit rate control, however, are relatively complex, typically requiring multiple passes to accomplish digital video encoding. Further, in particular, conventional approaches are designed to generate constant bit rate video signal, which may not be suitable for certain real-time video encoding devices, such as digital video disk (DVD) or camcorder-type video recording appliances. Additionally, such prior-art approaches are not structured optimally for integrated circuit semiconductor implementation.

Therefore, there is a need to provide low-complexity algorithm and system for generating variable bit rate image signals, particularly optimized for digital signal processing implemented in low-cost integrated circuit.

SUMMARY OF THE INVENTION

The invention resides in a digital signal processor for encoding compressed video signals preferably compliant to MPEG standard for providing variable bit rate (VBR) for interframe video coding. Integrated circuit provides single-pass, real-time digital image encoding for variable bit rate control to improve decoded output quality. Possible bit rate range for multiple groups of pictures (GOP) and averaged bit rate limit encoded signal bit rate. Such possible bit rate range constraint sets upper-lower range, which is pre-specified or adapted dynamically to current and future GOPs.

Signal processor may calculate perceptual weighting variable at macroblock level, nominal quantization parameters for each GOP, quantization parameter associated at picture level, effective bit rate for each GOP, bit allocation for each picture, and total bit allocation for multiple GOPs. Optionally, variable rate signal is recordable in DVD or camcorder device.

DETAILED DESCRIPTION OF THE PREFERRED EMBODIMENT

Figure 1:
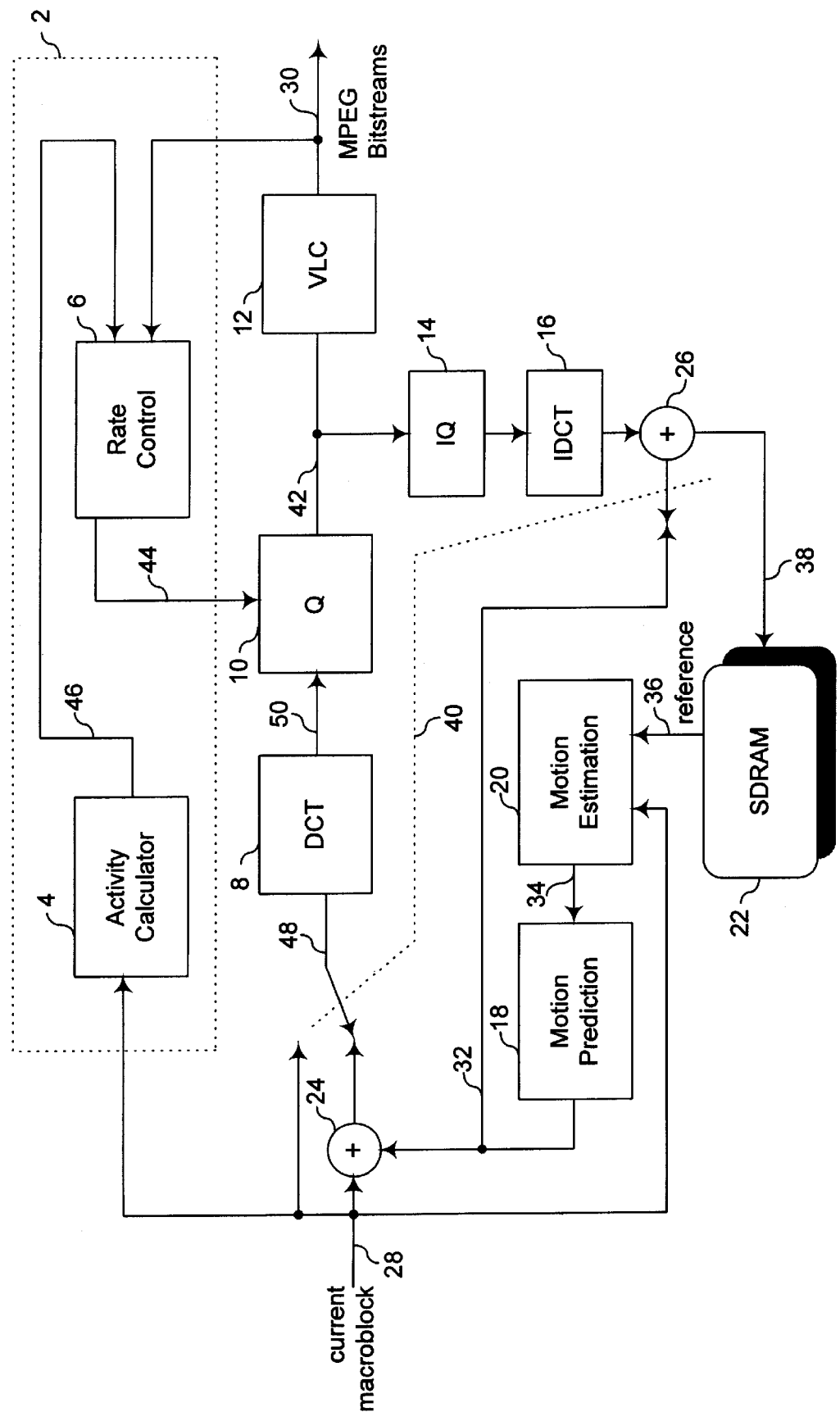
FIG. 1 is a block diagram of compressed digital video encoding system including variable bit rate portion according to the present invention.

FIG. 1 is a block diagram of digital signal processing system for encoding video image bit stream, preferably implemented according to MPEG 2 standard, and in particular, including novel improvement for Variable Bit Rate (VBR) signal processing. Input video signal 28 includes currently received macroblocks, pictures (I, P, or B), group of pictures (GOP), and sequence, and output video signal 30 includes MPEG encoded bit stream. Furthermore, as shown, input signal 28 is received by summing function 24, motion estimation block 20, switch 48, and variable bit rate control block 2.

As defined herein, a sequence is comprised of one or more GOP; a GOP is comprised of one or more picture, including at least one I-type picture which delimits particular GOP; a picture is comprised of one or more macroblocks; and a macroblock is comprised of one 16 by 16 pixel image data blocks.

Furthermore, the following terms, which are used as well herein, are defined accordingly:

L: Number of GOPs where bit resources are used for rate control

N: Number of pictures in a GOP $X_i$, $X_p$, $X_b$: Perceptual complexity measure of I, P, B pictures, respectively $d0_i$, $d0_p$, $d0_b$: Initial buffer fullness of I, P, B pictures, respectively $d_i$, $d_p$, $d_b$: Buffer fullness of I, P, B pictures, respectively $Q0_i$, $Q0_p$, $Q0_b$: Nominal Quantization parameters of I, P, B pictures, respectively $Q_i$, $Q_p$, $Q_b$: Quantization parameters of I, P, B pictures, respectively avg_act: Average activity measure of a picture R: Remaining bits including bit resources for the next (L-1) GOPs T: Allocated bit limit in a picture Tmin: Minimum allocated bit limit in a picture d: Buffer fullness S: Actual bit usage in a picture $N_i$, $N_p$, $N_b$: remaining I, P and B pictures in the current and the next (L-1) GOPs $n_i$, $n_p$, $n_b$: numbers of I, P and B pictures in a GOP.

Q: Actual quantization parameter dt: Excessive bit usage in a picture st: Actual bit count in a GOP dgop: Allocated bit count limit in a GOP r: Reaction parameter mquant: Quantization stepsize In accordance with the present invention, referring to FIG. 1, variable bit rate control block 2 includes activity calculator 4 which generates activity indication signal 46 received by rate control module 6, which also receives output signal 30. It is contemplated that activity calculator 4 and rate control 6, which may serve as symbolic or schematic representation of inventive process steps described herein, functionality may be implemented equivalently in software and/or hardware, such as conventional or proprietary microcontroller, digital signal processor, combinatorial digital logic, data storage structures, state machines, latches, registers, as well as equivalent microcode or other software.

Figure 4:
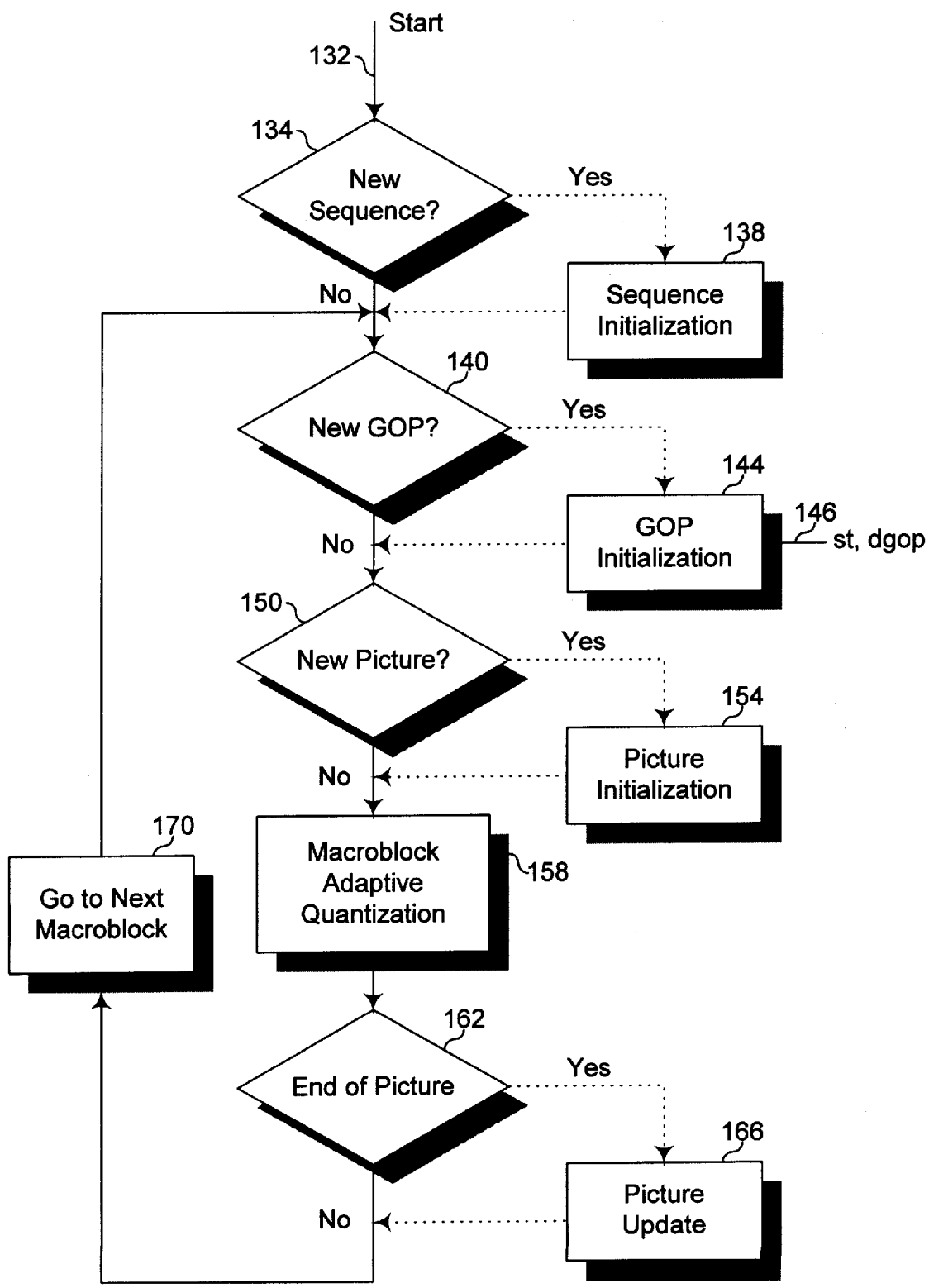
FIG. 4 is flow chart showing variable bit rate control according to the present invention.

Hence, for example, activity calculator module 4 may perform functional steps associated with new sequence recognition and initialization, new GOP recognition and initialization, and new picture recognition and initialization, whereas rate control module 6 coupled thereto may perform functional steps associated with macroblock adaptive quantization and picture update, as discussed herein and shown in FIG. 4. In this regard, activity indication signal 46 may correspond to various sequence, GOP, or picture activity information generated by activity calculator module 4.

Preferably, substantial portion, if not all, of system illustrated in FIG. 1 is implemented in single-chip Complementary Metal Oxide Semiconductor (CMOS) device to provide integrated low-cost, high-performance system solution.

Furthermore, preferably output signal 30 is provided to Digital Video Disk (DVD) appliance, camcorder device, or other commercially available apparatus for receiving recordable digital video signal having constant or variable bit rate.

Moreover, in the preferred embodiment, input signal 28 is processed digitally and effectively in real-time, within single computational pass (i.e., without substantial feedback to signal processing datapath, which would otherwise noticeably introduce undesirable delay to image processing), thereby generating high quality and performance video output signal 30 according to MPEG bit stream.

Still referring to FIG. 1, input signal 28 is summed through subtraction function 24 with predicted or estimated signal 32 to generate difference signal that is switched with input signal 28 by logic switch 48 according to defined switching criteria. For example, switching criteria is determined dynamically or automatically when such signals arrive and are evaluated for optimizing video encoding attributes.

Then, discrete cosine transform (DCT) module 8 receives switched signal from switch 48 and generates DCT signal 50 for transfer to quantization module (Q) 10. Preferably, DCT algorithm is optimized for circuit performance to reduce actual number of multiplications, e.g., by using less than 10-point DCT algorithm.

Q module 10 receives DCT signal 50 and generates quantized signal 42 using conventional divide function, which is received by Variable Length Coding (VLC) module 12 and Inverse Quantization (IQ) module 14. IQ module 14 generates IQ signal using conventional multiply function, which is received by inverse discrete cosine transform (IDCT) module 16, which preferably uses corresponding implementation for multiplication to optimize circuit performance, while conforming to IEEE Standard 1180.

VLC module 12 delivers encoded video signal 30, preferably according to MPEG bit stream format, for high-level video header packaging and further processing or storage. IDCT module 16 generates IDCT signal which is summed by summing module 26 using predicted signal 32. Summing module 26 generates summed signal 38 which is received by synchronous dynamic random access memory (SDRAM) 22.

Furthermore, as shown in FIG. 1, digital signal processing system includes motion prediction 18 and motion estimation 20 modules. Motion estimation module 20 receives reference signal 36 from SDRAM 22 and input signal 28 to generate therefrom "rough" motion estimation signal 34, which is then received by motion prediction module 18, which then generates therefrom "refined" prediction or estimation signal 32.

In this dual-stage manner, motion prediction is accomplished by initially pixel-averaging compressed bit stream and applying Sum-Of-Absolute-Difference (SOAD) function to generate minimum motion vector signal over selected range for preliminary determination, then motion estimation is refined by applying SOAD function a number of times to surrounding macroblocks by full or half-pel horizontal or vertical offsets further to select minimum motion vector signal.

Preferably, operational implementation motion estimation section 40, including motion estimation 20 and motion prediction 18 modules and associated processing algorithms, are functionally equivalent to such specifications disclosed in more detail in co-pending U.S. patent application Ser. No. 08/896,618, filed Jul. 18, 1997, by same assignee CRISC CORPORATION (Santa Clara, Calif.), entitled "MULTIPLE STAGE AND LOW-COMPLEXITY MOTION ESTIMATION FOR INTERFRAME VIDEO CODING", which is hereby incorporated by reference.

In accordance with a preferred implementation of the present invention, a single-pass variable bit rate control methodology and system are provided for MPEG II digital interframe video processing. Preferably, a single-chip integrated circuit provides high-performance image encoding with variable bit rate control to improve output signal quality. Possible bit rate range for multiple groups of pictures (GOP) or averaged bit rate is provided to limit encoded signal bit rate. In particular, possible bit rate range constraint sets upper or lower range, which may be pre-specified or adapted dynamically to current and future GOPs.

Furthermore, the inventive signal processing scheme may implement real-time calculation of perceptual weighting variable at macroblock level, nominal quantization parameters for each GOP, quantization parameter associated at picture level, effective bit rate for each GOP, bit allocation for each picture, and total bit allocation for multiple GOPs. Additionally, variable rate signal is recordable in DVD, camcorder, or other similar video processing device.

Figure 3:
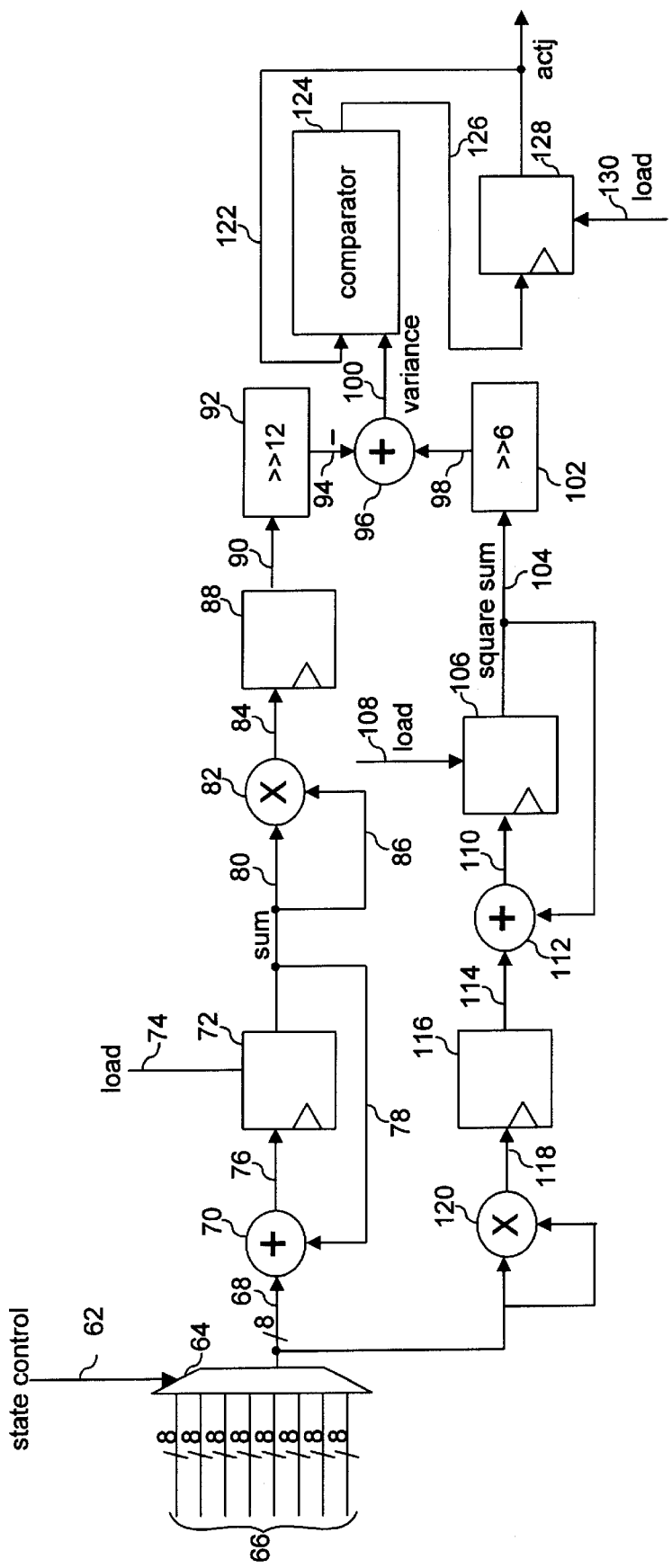
FIG. 3 is a schematic block diagram of activity calculator 4 functionality according to the present invention.

FIGS. 3 and 4 show more functional detail with respect to the preferred embodiment, respectively including schematic block diagram of activity calculator 4 functionality (FIG. 3), generalized flow chart showing variable bit rate control overall methodology (FIG. 4).

Generally, with respect to bit rate processing according to MPEG II, an important object of the present invention is to set forth an efficient and high performance variable bit rate (VBR) control algorithm to produce good quality video image perception, as well as provide improved compression rate of encoded bit stream. In some occasions, present system may be configured to enforce effectively as well fixed bit rate as a selectable option.

In this regard, various factors considered to select appropriate variable bit allocation algorithm for the inventive image processing scheme include: (1) picture complexity, (2) scale of quantization, (3) bandwidth requirement of transmission, (4) average bit rate, (5) peak bit rate constraints, as well as (6) longer term future bit stream activity looking ahead at multiple GOPs, and other related factors.

Hence, in the present VBR system, an important object is to maximize perceived quality as well as other empirical observable metrics associated with correspondingly decoded video image sequence, while maintaining such output signal bit rate within bounds permitted, preferably under MPEG or other video recording or playback device associated therewith. Accordingly, the present system effects bit rate limitation, rather than precise bit rate control, and, in particular, quantization parameters are limited within selected range, such that picture quality is maintained more consistently at certain level of viewer satisfaction.

Unlike conventional constant bit rate (CBR) control algorithm, VBR possesses more flexibility to allocate additional bits in the picture having complex scenery and/or high motion. This advantage arises since present VBR approach provides for less bit allocation during less busy or visibly active video scenes, while allocating more bits during higher motion scenes, such as sports events or other faster changing content.

Referring now to FIG. 4, a flow chart illustrates VBR control methodology steps, showing generally hierarchy in signal processing, starting at bit stream sequence level 134, then GOP level 140, then picture 150 and macroblock level 158. Additionally, corresponding initialization steps 138, 144, 154 and updates 166 are included. Preferably, such steps in FIG. 4 are implemented and performed as logical instructions included in computer program or microcode, for example, as provided for real-time, single-pass execution by conventional processor or other functionally equivalent proprietary controller.

To start bit stream, input video signal 132 is received for digital signal processing. Input signal 132 may be provided as standard "raw" video format, having 30 pictures or frames per second. Thus, ordinarily, each GOP is comprised of 15 frames, which are each delivered as three megabits of digital data over 0.5 second interval when averaged bit rate is set to 6 megabits per second. Preferably, processing under present methodology of multiple GOPs provides manageable look-ahead with three [L] GOPs in bit stream sequence.

Preferably, before or when new video bit stream or sequence is evaluated 134, sequence initialization steps 138 are conducted to set or reset certain values, for example, in following pseudo-code format, including remarks:

$$r = 2 \cdot \frac{\text{bit rate}}{\text{picture rate}},$$ /* defined reaction parameter* /

$$avg\_act = avg\_act0,$$ /* initial guess of average activity* /

$$T\min = \frac{\text{bit rate}}{8 \cdot \text{picture rate}},$$ /* allocated bits ensures minimum picture quality* /

$$Xi = \frac{160 \cdot \text{bit rate}}{115},$$ /* I picture perceptual complexity measure* /

$$Xp = \frac{60 \cdot \text{bit rate}}{115},$$ /* P picture perceptual complexity measure* /

$$Xb = \frac{42 \cdot \text{bit rate}}{115},$$ /* B picture perceptual complexity measure* /

$$di = d0i = \frac{10 \cdot r}{31},$$ /* virtual buffer fullness for I picture* /

$$dp = d0p = \frac{10 \cdot r}{31},$$ /* virtual buffer fullness for P picture* /

$$db = d0b = \frac{10 \cdot r}{31},$$ /* virtual buffer fullness for B picture* /

$$dt = st = dgop = 0.$$ /* excessive bit usage, initially zero* / if (q_scale_type = 1) /* nonlinear quantization* /

{

$$Qi = Q0i = 2 \cdot \frac{d0i \cdot 31}{r} + 10;$$ /* I picture quantization parameter* /

$$Qp = Q0p = 2 \cdot \frac{d0p \cdot 31}{r} + 8;$$ /* P picture quantization parameter* /

$$Qb = Q0b = 2 \cdot \frac{d0b \cdot 31}{r} + 8;$$ /* B picture quantization parameter* /

} else /* linear quantization* /

{

$$Qi = Q0i = \frac{d0i \cdot 31}{r} + 5; \quad \text{/* I picture quantization parameter*/}$$

$$Qp = Q0p = \frac{d0p \cdot 31}{r} + 4; \quad \text{/* P picture quantization parameter*/}$$

$$Qb = Q0b = \frac{d0b \cdot 31}{r} + 4; \quad \text{/* B picture quantization parameter*/}$$

}

Note that foregoing sequence initialization instructions are merely representative, and, in fact, are expected to be changed substantially and dynamically during subsequent evaluation of first and next pictures. Relative initialization ratios, however, between corresponding functional equations, for example, between perceptual weighted variables $Xi$, $Xp$, $Xb$, may remain comparably close to each other, even after initial values are overwritten during later signal processing.

Then, after new sequence receipt 134 and initialization 138, new GOP indication 140 is triggered upon receipt of I picture in bit stream. GOP initialization 144 is comprised of setting certain parameters toward limiting total bits, as follow, before encoding each new incoming GOP:

dt=dt+st−dgop, /* initialize excessive bit usage in picture 146*/ st=0. /* set actual GOP bit count to zero */

When quantization parameter value of P picture is deemed small relative to other comparable pictures in ordinary bit stream (e.g., P picture contains very complex sports content, thereby being finely quantized, preferably according to pre-defined threshold for determining such relative complexity), and whereby excessive bits are used in previous picture, then effective bit rate is set to default bit rate, and it is anticipated that such loss of total allocated bits will be recovered (hopefully) in remaining pictures in bit stream.

if (Qp<30 && dt<0) /* P picture quantization and excess bit conditions */ effective bit rate=bit rate. /* set default bit rate */

If quantization is relatively large (i.e., picture scene is comparatively simple, thereby being coarsely quantized), and whereby number of bits are left unused, effective bit rate is set again equal to default bit rate. In this way, remaining bits are reserved for future use by remaining GOPs.

if (Qp>50 && dt>0) /* P picture quantization and excess bit conditions */ effective bit rate=bit rate. /* set default bit rate */

Otherwise, in case of ordinary pictures having moderately simple or complex scenes, effective bit rate is increased or decreased correspondingly to low or high bit usage, preferably within specified total bit limit. Hence, when relatively more bits are used in previous picture, then proportionately decrease bit rate for current picture in process. And when relatively fewer bits are used in previous picture, then proportionately increase bit rate for current picture in process.

$$\text{effective bit rate} = \text{bit rate} - dt \cdot \frac{\text{picture rate}}{4 \cdot N}.$$

Moreover, effective bit rate is limited within upper or lower constraint range or possible peak bit rate range, e.g., [A, B]·bit rate, as follow:

if (effective bit rate>bit rate * B)

effective bit rate=bit rate * B; /* upper bit rate constraint */ if (effective bit rate<bit rate * A)

effective bit rate=bit rate * A; /* lower bit rate constraint */ where A and B are pre-specified or dynamically re-specified by users.

Then, total allocation limit of target bits for current GOP and (L−1) GOPs are calculated as follow:

$$dgop = N \cdot \frac{\text{bit rate}}{\text{picture rate}} \quad \text{/* GOP allocate bit count */}$$

$$R = N \cdot \frac{L \cdot \text{effective rate}}{\text{picture rate}} \quad \text{/* unused bits in multiple [L] GOPs */}$$

Furthermore, numbers of remaining pictures are updated as follow:

Ni=L·ni; /* number of remaining I pictures in multiple GOPs */

Np=L·np; /* number of remaining P pictures in multiple GOPs */

Nb=L·nb; /* number of remaining B pictures in multiple GOPs */

Then, following variables are also set:

Q0i=Qi; /* nominal quantization parameter for I picture */

Q0p=Qp; /* nominal quantization parameter for P picture */

Q0b=Qb; /* nominal quantization parameter for B picture */

Upon evaluating new picture 150, and preferably prior to encoding such picture, picture initialization 152, 154 is performed to compute target bit allocation for different types of pictures. Note that in order to consider multiple GOPs, different denominators representing various complexities, for example, are calculated below.

if (I-picture) /* I picture bit allocation */

$$T = \frac{R}{Ni + Np \cdot \frac{Xp}{Xi \cdot Kp} + Nb \cdot \frac{Xb}{Xi \cdot Kb}};$$

else if (*P*-picture)  /* P picture bit allocation */

$$T = \frac{R}{Ni \cdot \frac{XiKp}{Xp} + Np + Nb \cdot \frac{XbKp}{Xp \cdot Kb}};$$

else if (*B*-picture)  /* B picture bit allocation */

$$T = \frac{R}{Nb + Kb \cdot Ni \cdot \frac{Xi}{Kb} + Np \cdot \frac{KbXp}{KpKb}};$$

if (*T* < *Tmin*)

*T* = *Tmin*;  /* minimum bit allocation ensures minimum quality */ where Kp, Kb are constants preset or dynamically reset by users, depending upon desirable bit rate ratios among I, P, and B pictures.

Then, calculate quantization value depending upon picture coding type.

```
if (q_scale_type = 1)          /* Nonlinear quantization (larger dynamic range)* /
{
if (I-picture)
{
Qj = Q0i + 4 * (di / d0i – 1);  /* I picture variable quantization* /
threshold Qj to [Min_IQ, Max_IQ];
}
else if (P-picture)
{
Qj = Q0p + 4 * (dp / d0p – 1);  /* P picture variable quantization* /
threshold Qj to [Min_PQ, Max_PQ];
}
else if (B-picture)
{
Qj = Q0b + 4 * (db / d0b – 1);  /* B picture variable quantization* /
threshold Qj to [Min_BQ, Max_BQ];
}
Qj = Qj / 2;
}
else if (q_sale_type = 1)      /* Linear quantization (smaller dynamic range)* /
{
if (I-picture)
{
Qj = Q0i + 2 * (di / d0i – 1);  /* I picture variable quantization* /
threshold Qj to [Min_IQ / 2, Max_IQ / 2];
}
else if (P-picture)
```

-continued

```
{                                    /* P picture variable quantization*/

Qj = Q0p + 2 * (dp / d0p - 1);

threshold Qj to [Min_PQ/2, Max_PQ/2];

} else if (B-picture)

{

Qj = Q0b + 2 * (db / d0b - 1);       /* B picture variable quantization*/ threshold Qj to [Min_BQ/2, Max_BQ/2];

}

}
```

Then, clear accumulation registers as follow.
actsum=0;
Q=0;
For macroblock adaptive quantization step 158, first calculate perceptual weighted spatial activity measure for current macroblock as follows:

$actj = 1 + \min_{sblk=1 \ldots 8}(var\_sblk)$ /* See FIG. 3 for hardware implementation */ where $$var\_sblk = \frac{1}{64} \cdot \sum_{k=1}^{64}(Pk - Pmean)^2,$$

$$P\_mean = \frac{1}{64} \cdot \sum_{k=1}^{64} Pk.$$

Then, normalizing factor is computed as follows:

$$N\_actj = \frac{2 \cdot actj + avg\_act}{actj + 2 \cdot avg\_act}$$

where avg_act represents average activity of previous coded picture.

Quantization stepsize mquant for current macroblock is then calculated:

mquant=Qj·2·N_actj;

```
if (q_scale_type = 1)          /* Nonlinear quantization*/

{ threshold mquant to [1, 112];

/* Map mquant to corresponding value in non-linear quantization table*/

} else if (q_scale_type = 1)     /* Linear quantization*/

{ threshold mquant to [2, 62];

}
```

Activity and mquant are accumulated as follow:
actsum=actsum+actj
Q=Q+mquant

Figure 2:
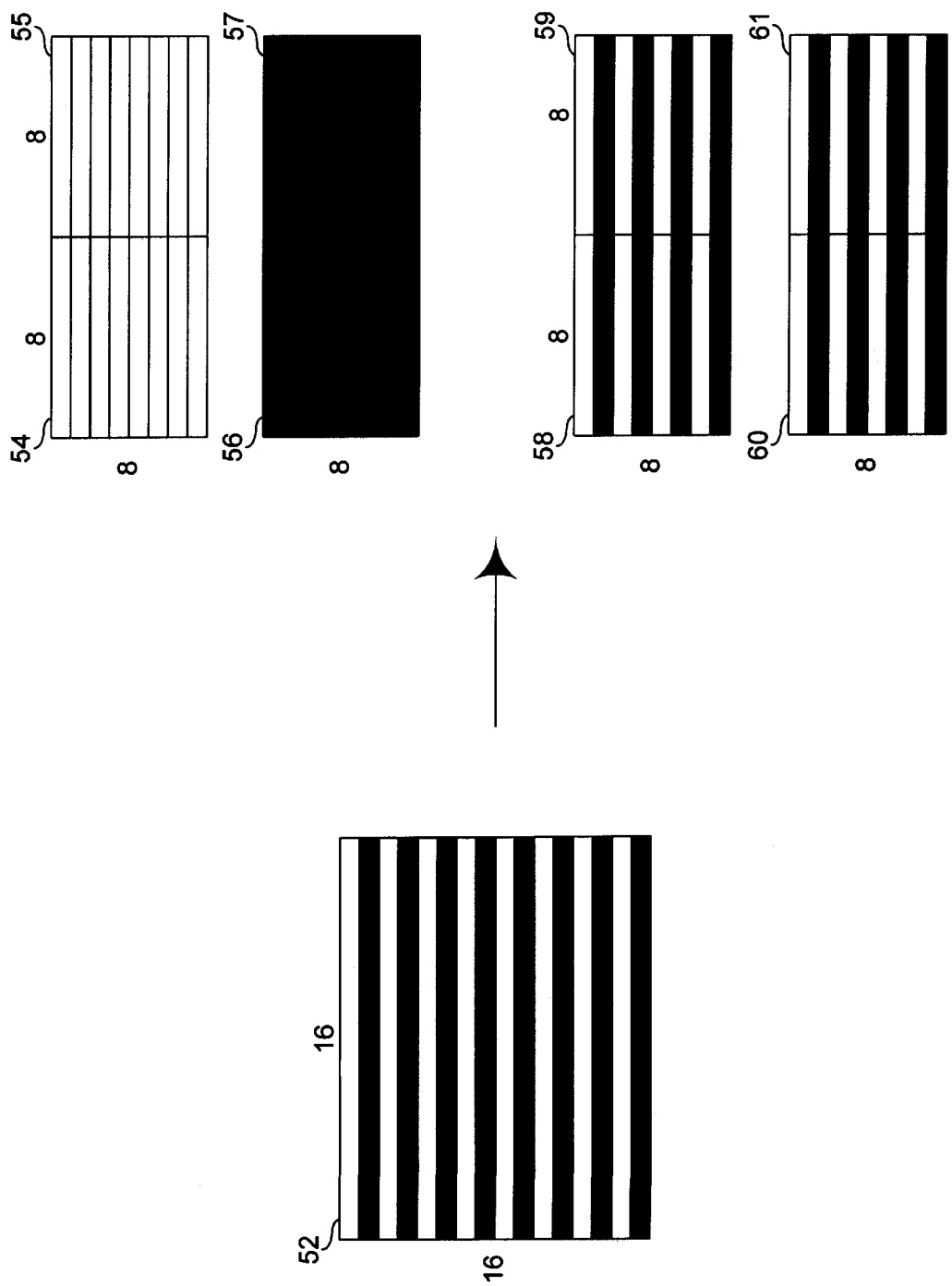
FIG. 2 is an illustrative diagram showing partition of a macroblock into 8 blocks for activity calculation.

In FIG. 2, 16 by 16 macroblock 52 is shown, illustrating partitioning into 8 by 8 blocks 54, 55, 56, 57, 58, 59, 60, 61. Blocks 54, 55 are comprised of even rows of macroblock 52, and blocks 56, 57 are comprised of odd rows of macroblock 52. Blocks 58, 59 are comprised of top 8 rows of macroblock 52, and blocks 60, 61 are comprised of bottom 8 rows of macroblock 52. The 8 partitioned blocks are used for calculating activity index for such macroblock, as shown in FIG. 3.

Referring to FIG. 3, with respect to actj, as described above, calculation [i.e., actj=1+min$_{sblk=1 \ldots 8}$(var_sblk)], representative single-pass hardware implementation is illustrated. It is contemplated that, preferably, any or all functionally or logically equivalent portions of inventive VBR methodology and instruction code, as described herein, may be implemented similarly using proprietary controller/data path or generalized microprocessor architecture in CMOS integrated circuit to improve system performance and cost.

Moreover, it is contemplated that shown circuit may be reusable generally as second-order characteristic calculator for other related system functions, such as mode decision circuit in motion predictor/estimation blocks 18, 20.

Thus, as shown in FIG. 3, multiplexer 64 receives state control signal 62 to select particular 8-bit line from 8 available incoming lines 66 that correspond to 8 partitioned blocks 54, 55, 56, 57, 58, 59, 60, 61 illustrated in FIG. 2, thereby generating selected line 68 which is received by summing function 70 and multiplying function 120, which respectively generate summed signal 76 and multiplied signal 118. Register 72 receives summed signal 76 upon application of load signal 74 to generate sum signal 80, which is applied to summing function 70 and multiplying function 82, thereby generating multiplied signal 84. Register 88 receives multiplied signal 84 to generate signal 90, which is shifted right 12 bits 92 to generate shifted signal 94.

Multiplied signal 118 is received by register 116 to generate signal 114, which is received by summing function 110, which then generates summed signal 110. Register 106, upon application of load signal 108, generates square sum signal 104, which is applied to summing function 112. Square sum signal 104 is shifted right 6 bits to generate shifted signal 98.

Summing function 96 receives shifted signal (−) 94 and shifted signal 98 to generate variance signal 100. Comparator 124 receives variance signal 100 and generates compared signal 126, which is applied to register 128, upon application of load signal 130. Register 128 generates actj signal 122, which is applied to comparator 124, and provided therefor as resultant signal representing spatial activity measure for current macroblock.

Then, referring back to FIG. 4, after encoding whole picture 162, particularly upon processing last macroblock in bit stream, miscellaneous information are updated 166, as follow, after which, processing continues to next macroblock 170.

1. Calculate total bit count limit in picture just encoded, S.
2. Calculate number of remaining bits, R=R−S
3. Estimate perceptual complexity of next same-type picture as follows:

$$X = \frac{S \cdot Q}{2 \cdot (\text{total number of macroblocks})}$$

4. Calculate excessive usage of bits in picture, d=d+S−T.
5. Calculate actual bit count up to current picture in GOP, st.
6. Calculate average quantization parameter $$Q = \frac{Q}{\text{Total number of macroblocks}}.$$

7. Calculate average activity $$avg\_act = \frac{actsum}{\text{Total number of macroblocks}}.$$

8. Update corresponding parameters according to different picture types:

if (*I*-picture)   /* I picture parameters* /
{
$Xi = X$;
$di - d$;
$Qi = Q$;

-continued $Ni = Ni - 1$;
}
else if (*P*-picture)   /* P picture parameters* /
{
$Xp = X$;
$dp = d$;
$Qp = Q$;
$Np = Np - 1$;
}
if (*B*-picture)   /* B picture parameters* /
{
$Xb = X$;
$db = d$;
$Qb = Q$;
$Nb = Nb - 1$;
}

Figure 5:
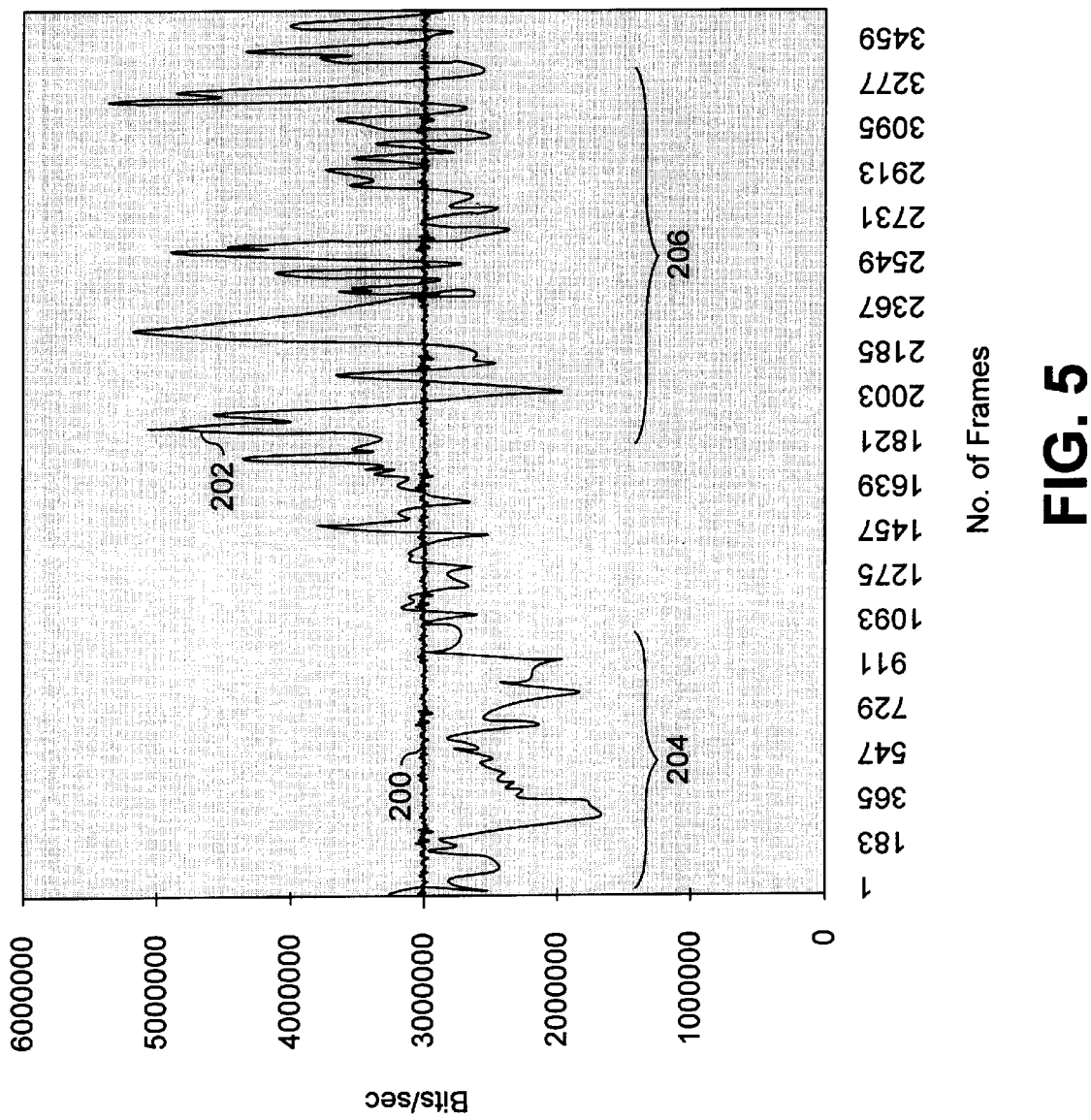
FIG. 5 is a sample data chart showing actual video traffic, comparing constant to variable bit rate control.

FIG. 5 shows sample chart of actual video clip including 3,600 frames, comparing constant bit rate (CBR) 200 to VBR 202 data. Note in early data portion 204, CBR data 200 reflects higher bit rate, but which may be less observable by human eye. However, in later data portion 206, VBR data 202 reflects higher bit rate, during more sensitive content period. In such sensitive portion 206, therefore, higher bit allocation is accomplished. As a result, overall perceptual visual quality is improved for VBR signal processing.

What is claimed is:

1. In an image processing system for encoding digital video signal, a method for variably controlling signal bit rate to improve video quality, the method comprising the steps of:

receiving a first signal including a plurality of groups of pictures (GOPs), and determining a bit rate constraint comprising a peak bit rate and an averaged bit rate associated with such multiple GOPs; and processing the first signal to generate therefrom in a single processing pass an encoded second signal having a variable bit rate limited by the bit rate constraint, such multiple GOPs being processed effectively in a look-ahead factor associated with a plurality of GOPs in a specified bit-stream sequence, wherein each of said multiple GOPs comprises at least one I-type picture, said I-type picture delimiting each of said multiple GOP from other GOPs of said multiple GOPs.

2. The method of claim 1 wherein:

the receiving and processing steps are implemented substantially in an integrated circuit.

3. The method of claim 1 wherein:

the encoded second signal is stored in a video recording device.

4. The method of claim 1 wherein:

the bit rate constraint being pre-specified or dynamically re-specified for current or future GOP.

5. The method of claim 1 wherein:

the encoded second signal being limited further by a perceptual weighting variable associated with one or more macroblock associated with one or more GOP.

6. The method of claim 1 further comprising the step of:

determining one or more nominal quantization parameter associated with such multiple GOPs.

7. The method of claim 1 further comprising the step of:

determining one or more quantization parameter associated with one or more picture.

8. The method of claim 1 wherein:

the encoded second signal being limited further by a total bit limit associated with such multiple GOPs.

9. The method of claim 1 further comprising the step of:

determining an effective bit rate associated with one or more GOP.

10. The method of claim 1 further comprising the step of:

determining a bit allocation associated with one or more picture.

11. An integrated digital video processing system comprising:

an MPEG-2 compliant real-time digital image encoding subsystem for receiving an input video signal including a plurality of groups of pictures (GOPs), and generating therefrom, in a single processing pass, an output encoded video signal, such multiple GOPs being processed effectively in a look-ahead factor associated with a plurality of GOPs in a specified bit-stream sequence; and digital signal processing means coupled to such subsystem for processing the video signal to determine a variable bit rate limited by a bit rate constraint associated with such multiple GOPs, such bit rate constraint comprising a peak bit rate and an averaged bit rate, being pre-specified or dynamically re-specified for one or more current or future GOPs, wherein each of said multiple GOPs comprises at least one I-type picture, said I-type picture delimiting each of said multiple GOP from other GOPs of said multiple GOPs.

12. The system of claim 11 wherein:

the digital signal processing means determines a perceptual weighting variable associated with one or more macroblock associated with such multiple GOPs, one or more nominal quantization parameter associated with such multiple GOPs, one or more quantization parameter associated with one or more picture, an effective bit rate associated with one or more GOP, a bit allocation associated with one or more picture, or a total bit limit associated with such multiple GOPs.

13. The system of claim 11 wherein:

the output encoded video signal is received by a digital video disk (DVD) or camcorder-type device, wherein such signal may be stored in such device.

14. A single-pass variable bit rate controller comprising:

an activity calculator for receiving a signal comprising a plurality of macroblocks including a plurality of groups of pictures (GOPs), and determining an activity measure for each such macroblocks and a bit rate constraint comprising a peak bit rate and an averaged bit rate associated with each such macroblocks; and a rate controller coupled to the activity calculator for processing the received signal to determine a quantization parameter to provide variably a bit rate according to the bit rate constraints, such multiple GOPs being processed effectively in a look-ahead factor associated with a plurality of GOPs in a specified bit-stream sequence, wherein each of said multiple GOPs comprises at least one I-type picture, said I-type picture delimiting each of said multiple GOP from other GOPs of said multiple GOPs.

15. The controller of claim 14 wherein:

the rate controller further provides a perceptual weighting variable associated with one or more macroblock associated with such GOP, one or more nominal quantization parameter associated with such GOP, one or more quantization parameter associated with one or more picture, an effective bit rate associated with one or more GOP, a bit allocation associated with one or more picture, or a total bit limit associated with such GOP.

16. A process for generating a variable bit rate signal comprising the steps of:

determining a bit rate range for one or more groups of pictures (GOPs) in a digital video bit stream and a bit rate constraint comprising a peak bit rate and an averaged bit rate associated with multiple GOPs; and generating in a single processing pass according to the bit rate constraint an encoded signal from the digital video bit stream, the encoded signal having a bit rate which is controllable within the bit rate range, such multiple GOPs being processed effectively in a look-ahead factor associated with a plurality of GOPs in a specified bit-stream sequence, wherein each of said multiple GOPs comprises at least one I-type picture, said I-type picture delimiting each of said multiple GOP from other GOPs of said multiple GOPs.

* * * * *